(12) United States Patent
Alneghaimish

(10) Patent No.: US 11,125,577 B2
(45) Date of Patent: Sep. 21, 2021

(54) SYSTEM AND METHOD FOR PARKING MANAGEMENT

(71) Applicant: KING FAHD UNIVERSITY OF PETROLEUM AND MINERALS, Dhahran (SA)

(72) Inventor: Abdulelah Alneghaimish, Dhahran (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 0 days.

(21) Appl. No.: 15/940,716

(22) Filed: Mar. 29, 2018

(65) Prior Publication Data

US 2018/0283894 A1 Oct. 4, 2018

Related U.S. Application Data

(60) Provisional application No. 62/478,184, filed on Mar. 29, 2017.

(51) Int. Cl.
| | | |
|---|---|---|
| *G01C 21/36* | (2006.01) | |
| *G08G 1/14* | (2006.01) | |
| *G01C 21/32* | (2006.01) | |
| *G08G 1/04* | (2006.01) | |

(Continued)

(52) U.S. Cl.
CPC ........ *G01C 21/3685* (2013.01); *G01C 21/32* (2013.01); *G08G 1/015* (2013.01); *G08G 1/04* (2013.01); *G08G 1/096816* (2013.01); *G08G 1/142* (2013.01); *G08G 1/143* (2013.01); *G08G 1/146* (2013.01)

(58) Field of Classification Search
None
See application file for complete search history.

(56) References Cited

U.S. PATENT DOCUMENTS

| | | | | |
|---|---|---|---|---|
| 6,147,624 A | * | 11/2000 | Clapper | G08G 1/14 340/4.6 |
| 6,771,185 B1 | * | 8/2004 | Yoo | G06Q 30/0284 340/525 |

(Continued)

FOREIGN PATENT DOCUMENTS

| | | |
|---|---|---|
| CN | 104169989 B | 3/2016 |
| WO | WO 2015114592 A1 | 8/2015 |
| WO | WO 2016/109076 A1 | 7/2016 |

OTHER PUBLICATIONS

Farooq Mian, "Vehicle Parking System", Dec. 25, 2012, The Institute of Management Science (Pak-AIMS) (Year: 2012).*

(Continued)

*Primary Examiner* — Dale W Hilgendorf
*Assistant Examiner* — Alexander C. Bost
(74) *Attorney, Agent, or Firm* — Oblon, McClelland, Maier & Neustadt, L.L.P.

(57) ABSTRACT

A system, computer readable medium, and a method for parking management are provided. The method receives, via communication circuitry, an input from an electronic device. The input includes at least destination information of a user of a vehicle. The method identifies a parking space for the vehicle based on the input and generates navigational directions to the identified parking space. Further, the method provides the navigational directions to at least one output device.

13 Claims, 11 Drawing Sheets

(51) Int. Cl.
  *G08G 1/015* (2006.01)
  *G08G 1/0968* (2006.01)

(56) References Cited

U.S. PATENT DOCUMENTS

| | | | |
|---|---|---|---|
| 8,816,880 B1 * | 8/2014 | Foster | G08G 1/146 |
| | | | 340/932.2 |
| 8,947,260 B2 * | 2/2015 | Fukushima | G08G 1/0175 |
| | | | 180/199 |
| 10,169,995 B2 * | 1/2019 | Bostick | G08G 1/143 |
| 2004/0252034 A1 | 12/2004 | Slemmer et al. | |
| 2005/0033634 A1 | 2/2005 | Pugliese | |
| 2006/0253226 A1 | 11/2006 | Mendelson | |
| 2013/0030702 A1 | 1/2013 | Yamamoto | |
| 2013/0265174 A1 * | 10/2013 | Scofield | G01C 21/34 |
| | | | 340/932.2 |
| 2014/0176348 A1 * | 6/2014 | Acker, Jr. | G08G 1/144 |
| | | | 340/932.2 |
| 2014/0350855 A1 * | 11/2014 | Vishnuvajhala | G01C 21/3685 |
| | | | 701/538 |
| 2015/0130641 A1 * | 5/2015 | Rahman | G08G 1/142 |
| | | | 340/932.2 |
| 2015/0138001 A1 * | 5/2015 | Davies | G08G 1/149 |
| | | | 340/932.2 |
| 2015/0353080 A1 * | 12/2015 | Mukaiyama | E05B 77/54 |
| | | | 701/23 |
| 2016/0140846 A1 * | 5/2016 | Outwater | G08G 1/144 |
| | | | 340/932.2 |
| 2016/0180712 A1 * | 6/2016 | Rosen | G01C 21/36 |
| | | | 705/5 |
| 2016/0300489 A1 * | 10/2016 | Shafran | G07B 15/02 |
| 2017/0018183 A1 * | 1/2017 | Rosen | G08G 1/015 |
| 2017/0076603 A1 * | 3/2017 | Bostick | G08G 1/143 |
| 2018/0053422 A1 * | 2/2018 | Altinger | G05D 1/0297 |

OTHER PUBLICATIONS

Agrawal, et al. "Parking navigation and payment system using IR sensors and RFID technology" International Journal of Computer Applications (0975-8887) vol. 111—No. 15, Feb. 2015.

Ferreira, et al. "Self-automated parking lots for autonomous vehicles based on vehicular ad hoc networking", 2014 IEEE Intelligent Vehicles Symposium (IV), Jun. 8-11, 2014. Dearborn, Michigan, USA.

* cited by examiner

SYSTEM AND METHOD FOR PARKING MANAGEMENT

CROSS-REFERENCE TO RELATED APPLICATIONS

This application claims the benefit of priority from U.S. Provisional Application No. 62/478,184 filed Mar. 29, 2017, the entire contents of which are incorporated herein by reference.

BACKGROUND

Field of the Invention

The present disclosure relates to a parking system, parking method and parking device that include an output device, a server to receive destination information, identify a parking space, generate navigational directions to the parking space, and provide navigational directions.

Description of the Related Art

Parking lots are known to be complex in design especially those of large capacities. To smoothen the traffic flow in to/and out of a parking lot, traffic engineering mechanisms are used when designing a layout of the parking lot.

From a driver perspective, the driver has to make a decision when it comes to selecting between multiple paths in the parking lot in order to find a space to park the vehicle. In some parking lots, drivers are presented with how many free spaces are available to park before they enter the floor/level or sometimes before they enter the parking structure. So, the driver may choose the level at which there are free spaces and start looking for a parking space trying different paths, mostly, starting from the one that is closest to their destination gate. Once the driver finds a parking space and parks a sensor may detect the vehicle and may indicate that the parking space is occupied. The count of free spaces may be decreased by one.

However, the process of finding a parking space might be difficult and time consuming. Further, the process may create problems in the traffic flow within the parking structure when multiple drivers are looking for free spaces and few free spaces are available.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

The present disclosure relates to a parking management method that receives, via communication circuitry, an input from an electronic device. The input includes at least destination information of a user of a vehicle. The method identifies a parking space for the vehicle based on the input and generates navigational directions to the identified parking space. Further, the method provides the navigational directions to at least one output device.

In one aspect, the present disclosure relates to a parking system. The parking system includes an output device and a server. The server is configured to receive, via communication circuitry, an input from an electronic device, the input including at least destination information, identify a parking space based on the input, generate navigational directions to the identified parking space, and provide via the communication circuitry, the navigational directions to the output device.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
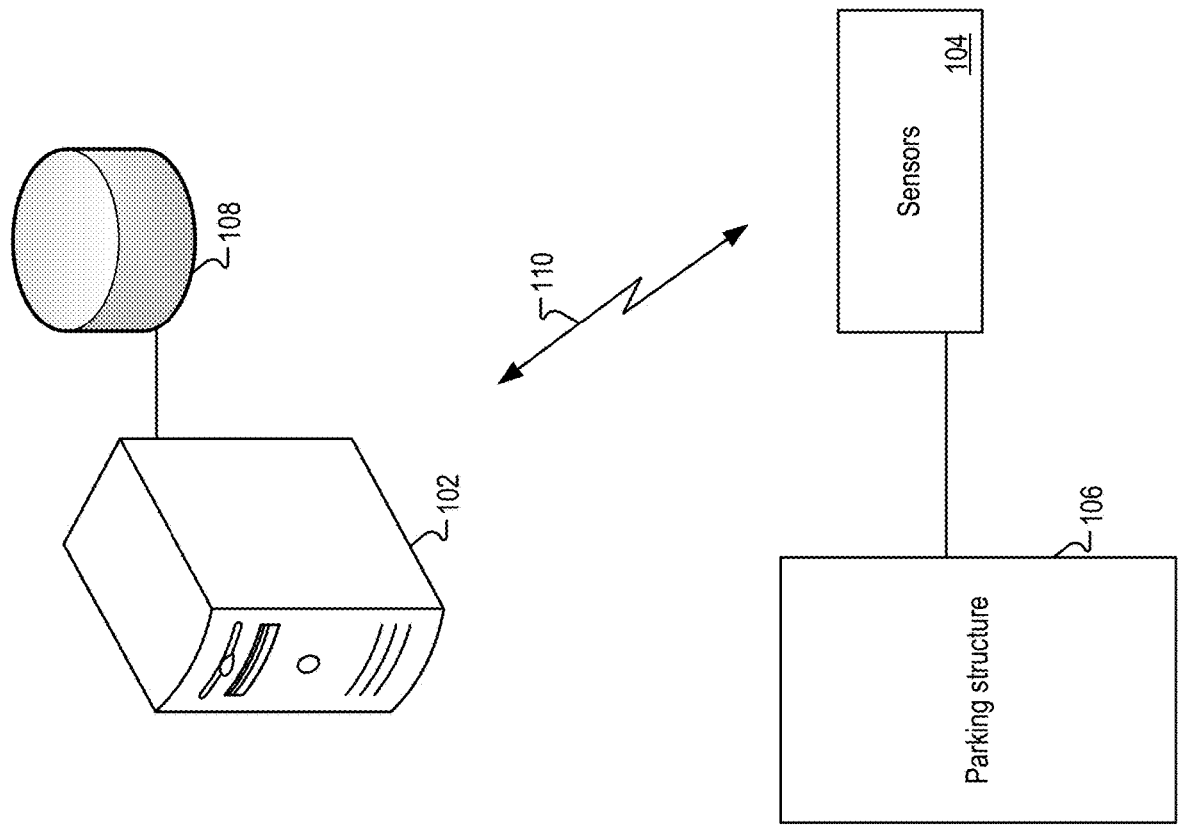
FIG. 1 is a schematic of a system environment according to one example.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Referring now to the drawings, wherein like reference numerals designate identical or corresponding parts throughout several views, the following description relates to a system and associated methodology for parking management. The system minimizes traffic flow inside a parking structure.

Figure 7:
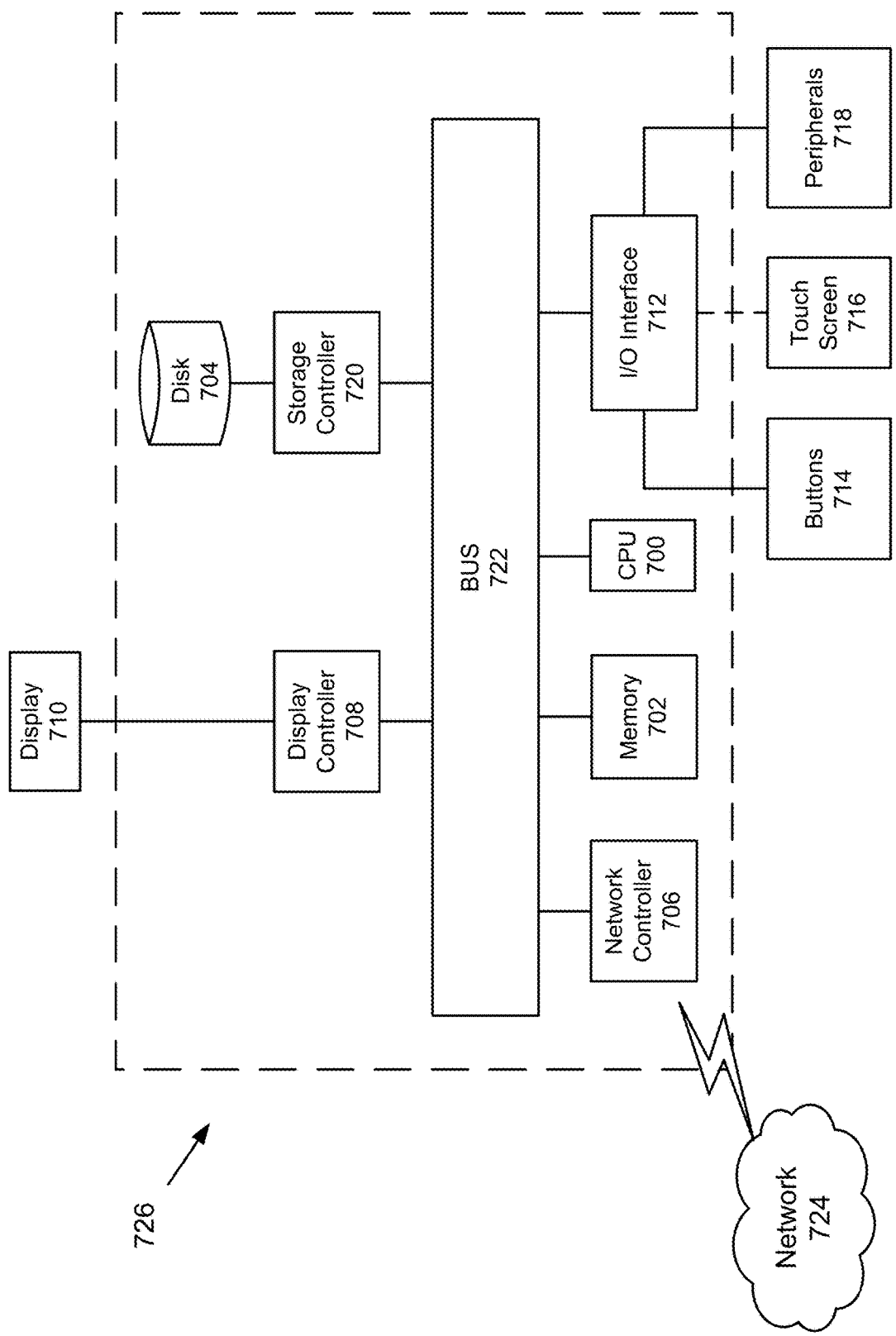
FIG. 7 is a block diagram of a server according to one example.

FIG. 1 is a schematic of a system environment 100 according to one example. The system may include a server 102, sensors 104 (e.g., cameras, radar, infrared sensors, ultrasonic sensors, or the like), and a database 108. The sensors 104 may be one or more sensors configured to transmit data to the server 102. The sensors 104 may be fixed to at least one wall and/or ceiling of a parking structure 106. The sensors 104 and the server 102 may communicate via a wireless communication link 110. The wireless communication link 110 may include, but is not limited to, WiFi, Bluetooth technology, and/or a combination thereof. The server 102 may include a central processing unit (CPU) which performs the processes described herein. An exemplary block diagram of a server 102 is shown in FIG. 7.

The server 102 may receive a request to identify an available parking space within the parking structure 106 from one or more vehicles 112. In one implementation, the request may be sent from an electronic device associated with a user of the vehicle 112. The request may also be received via a user interface of a device located at an entrance of the parking structure 106. The request may also be sent via a head unit of the vehicle 112. For example, the head unit of the vehicle 112 may receive an input from the vehicle user via a user interface. The user interface may include buttons, a touch screen, a microphone, a speaker, or the like. The head unit may display navigational directions to the identified parking space as described further below.

The vehicle 112 may be of any type of cars, trucks, sport utility vehicles, vans, mini-vans, automotive vehicles, commercial vehicles, agricultural vehicles, construction vehicles, specialty vehicles, recreational vehicles, buses, motorcycles, or other types of vehicles. The vehicle may be gas-powered, diesel powered, electric, or solar-powered. The vehicle may be actively operated by a driver or may be partially or completely autonomous or self-driving.

The vehicle 112 may include a communication module. The communication module may be a transceiver configured to establish a communication with the one or more sensors 104, database 108, or the server 102 via the communication link 110 or a network. The network can be a public network, such as the Internet, or a private network such as LAN or WAN network, or any combination thereof and can also include PSTN or ISDN sub-networks. The network can also be a cellular network including EDGE, 3G and 4G wireless cellular systems. The wireless network can also be WiFi®, Bluetooth®, or any other wireless form of communication that is known.

The modules described herein may be implemented as either software and/or hardware modules and may be stored in any type of computer-readable medium or other computer storage device. For example, each of the modules described herein may be implemented in circuitry that is programmable (e.g. microprocessor-based circuits) or dedicated circuits such as application specific integrated circuits (ASICS) or field programmable gate arrays (FPGAS). In one embodiment, a central processing unit (CPU) could execute software to perform the functions attributable to each of the modules described herein. The CPU may execute software instructions written in a programming language such as Java, C, or assembly. One or more software instructions in the modules may be embedded in firmware, such as an erasable programmable read-only memory (EPROM).

The database 108 may be a cloud database or associated with the server 102. The database 108 may store information and data associated with the sensors 104. For example, the database 108 may store the operational status of each sensor and information associated with the parking space associated with the sensors 104 (e.g., image, parking availability, restricted hours, reverse parking only, parallel parking only, and the like). The database 108 may also store a look-up table including an identification of each parking space and the status of the parking space (i.e., occupied, available).

The vehicle user may select a destination (e.g., gate identification information). The server 102 analyses available parking spaces to determine an optimal parking space based on the destination. For example, the server 102 may check each parking space by order of proximity to the destination (i.e., lower level) until the server 102 detects an available parking space. In one implementation, the server 102 may retrieve all available parking spaces from the database 108. Then, the server 102 may identify the nearest available parking space to the destination among the available parking spaces.

The system, via the server 102, may generate navigational directions from the location of the vehicle to the identified parking space. The server 102 may generate the navigational directions based on a shortest and/or a fastest path to the identified parking space as described further below. The navigational directions may be in the form of a navigational map. The navigational map may be output on an entrance ticket obtained when the vehicle enters the parking structure. In one implementation, the navigational directions may be output to the vehicle via the communication link 110. The navigational directions may also be output to an electronic device (e.g., smartphone) associated with the vehicle user.

In one implementation, direction devices (e.g., indicators such as displays) positioned throughout the parking structure may automatically guide the vehicle user to the identified parking space. For example, the displays may output the navigational directions in a text and/or graphic format. The navigational directions may be audibly provided using an automated voice translation system that converts digital data to a verbal message that can be transmitted over predetermined broadcast systems such as radiochannel(s) or speaker thereby directing the driver to the identified parking space. The direction devices may communicate with the server 102 via the network or communication link 110. The direction devices may receive the navigational direction information from the server 102. In one implementation, each direction device may output a navigational information map or instruction once a vehicle is detected. For example, when the direction device via a sensor coupled to the direction device detects a vehicle, the direction device may retrieve the navigational information associated with the detected vehicle. Then, the display may output information corresponding to one or more steps of the navigational information.

In one implementation, the direction device may identify the vehicle 112 using near field communication between a smart card and the direction device. The smart card may be given to the vehicle user at the entrance of the parking structure 106. For example, the display may be positioned at each intersection of one or more paths in the parking structure. When the vehicle is detected at the intersection the display outputs an indication of the navigational step to be followed by the driver such as a straight arrow, a left arrow or a right arrow. The direction devices may include communication circuitry to communicate with vehicle 112 and the server 102. The direction devices may also include processing circuitry. In some implementations, the direction devices may also include one or more cameras, microphone, and speakers to communicate with the vehicle user.

The direction devices may have a sleep or standby mode to reduce battery or power consumption. For example, the display of the direction device may be turned off when no vehicle in the vicinity of the direction device is detected. The direction devices may optionally include a solar or photocell charger. Further, the direction devices may periodically communicate with the server 102 or be prompted to upload status information such as battery status and/or operation status (e.g., fault detected).

In one implementation, occupied spaces may be detected via the sensors 104. Occupied spaces may also be updated in response to the server 102 assigning a space to a vehicle when entering the parking structure 106. Once the vehicle exits the parking structure 106, the parking space is marked as unoccupied in the database 108. The server 102 may identify the parking space previously occupied by the vehicle using information printed on the parking ticket obtained when the vehicle entered the parking structure 106. The server 102 may also identify the parking space using identification information (e.g., a unique reference) assigned when the parking space is assigned to the vehicle 112. The identification information may be detected from the electronic device associated with the vehicle user (e.g., scanning a barcode while exiting the parking structure).

In one implementation, the identification information may correspond to a vehicle identification (e.g., license plate indicia). The license plate may be detected using one or more cameras positioned at the entrance/exit of the parking structure. The one or more cameras may capture one or more images of the license plate. The license plate indicia (e.g., alpha-numeric characters and additional graphic information) may be determined using text recognition techniques (e.g., pattern recognition, feature extraction) as would be understood by one of ordinary skill in the art.

Figure 2:
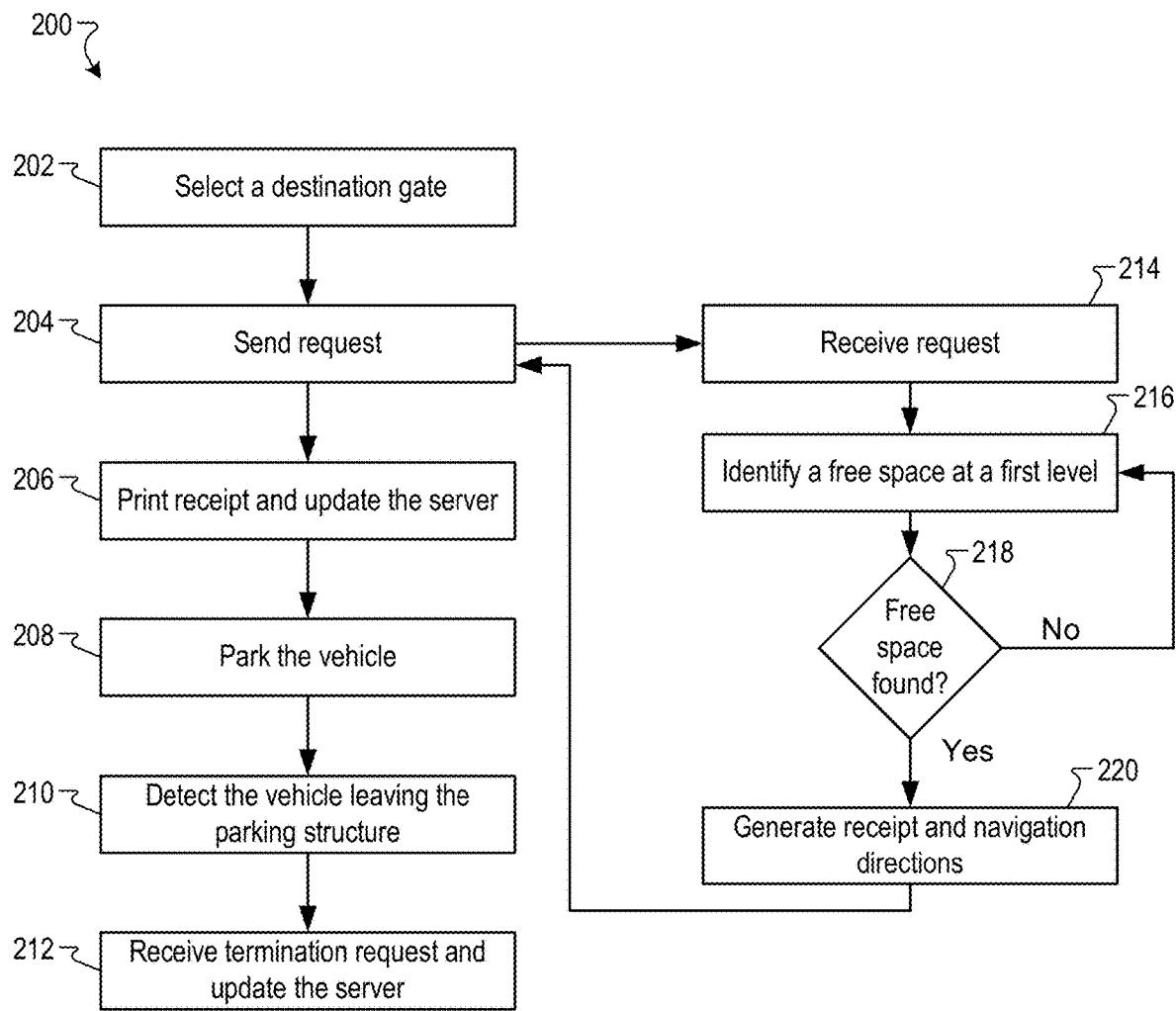
FIG. 2 is a flowchart for a method for parking management according to one example.

FIG. 2 is a flowchart for a method 200 for parking management according to one example. At step 202, the system may receive a selection for a destination (e.g., destination gate) from an entrance device associated with the parking structure, an electronic device associated with the vehicle user, or other devices as would be understood by one of ordinary skill in the art. At step 204, the selection (i.e., request to park) is sent to the server 102. At step 214, the server 102 may receive the selection.

At the initialization of the system, all parking spaces may be marked as empty in the database 108. Empty/available parking spaces may be assigned by the server. Once the server 102 assigns a space to a vehicle, the database 108 is updated. The parking space is marked as occupied/unavailable. Thus, the system is able to track the number of vehicles inside the parking structure 106, the availability of each space, and the location of each vehicle.

At step 216, the server 102 may identify an available space at a first level of the parking structure 106. In other implementations, the server 102 may identify an available space closest to the destination request. At step 218, in response to determining that an available space is found at the first level of the parking structure 106, the process proceeds to step 220. In response to determining that there is no available space at the first level, a level counter may be updated and the process proceeds to step 216 where the server 102 may identify an available space at the updated level. At step 220, the server 102 may generate a receipt and navigational directions to the identified parking space. Then, the server 102 may output the receipt and the navigational directions to the entrance device associated with the parking structure 106 or the electronic device associated with the vehicle user.

At step 206, the receipt may be printed or output on the electronic device associated with the vehicle user. The server 102 may update the database 108 to mark the identified parking space as unavailable. At step 208, the vehicle user may proceed to park the vehicle in the identified parking space. In one implementation, when the vehicle is an autonomous vehicle, the navigational directions may be used by one or more vehicle subsystems of the autonomous vehicle to navigate the vehicle to the identified parking space.

At step 210, the system may detect that the vehicle is leaving the parking structure 106. For example, an exit device may receive the ticket from the vehicle user. In other implementations, the system may detect a payment through the electronic device associated with the vehicle user that may indicate that the vehicle is exiting the parking structure 106. In one implementation, the sensor 104 located at an exit entrance may detect an identification of the vehicle (e.g., license plate indicia). At step 212, the vehicle information may be sent to the server 102. The server 102 may update the database 108. For example, the database 108 may retrieve the parking space information associated with the vehicle. Then, the parking space may be marked as available.

Figure 3:
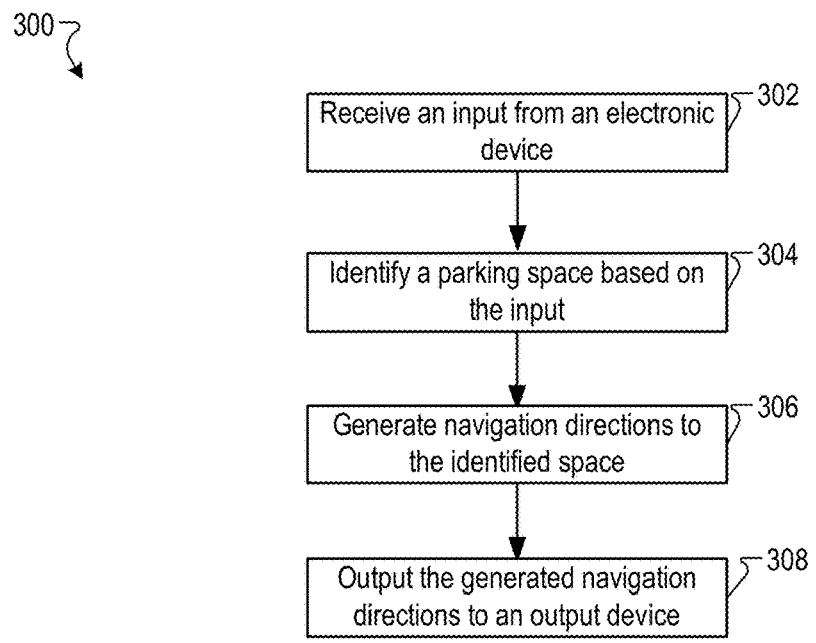
FIG. 3 is a flowchart for a parking space selection process according to one example.

FIG. 3 is a flowchart for a parking space selection process 300 according to one example. At step 302, the server 102 may receive an input from an electronic device. The input may include at least destination information associated with the vehicle user (e.g., gate, store name in a shopping mall, section associated with seats in a sport arena, or the like). At step 304, the server 102 may identify a parking space based on the input and a plurality of factors. The availability of the parking spaces may be monitored via the sensors 104 positioned at each parking space and/or based on parking space assignment by the server 102.

The plurality of factors may include a type of the vehicle 112, a permit associated with the vehicle 112, destination information associated with preceding vehicles, or other factors as would be understood by one of ordinary skill in the art. For example, the vehicle user may indicate a type of vehicle such as compact or oversized vehicle. In one implementation, the type of the vehicle may be detected automatically via a camera associated with the entrance device. For example, the server 102 may estimate overall dimensions of the vehicle based on one or more images captured by the camera. The type of the vehicle 112 may be determined based on the overall dimensions. In response to determining that the type of vehicle is oversized or compact, the server 102 may search for an available space among available spaces that are marked oversized or compact. Further, the electronic device may receive an indication that the vehicle user has a special permit (e.g., a handicap tag). In response to determining that the vehicle user has a special permit, the server 102 may select an available parking space among available parking spaces marked "Handicap parking" in the database 108.

In one implementation, the server 102 may select available space at alternate levels or rows when two or more vehicle users having the same destination enter the parking structure 106 within a predetermined period (e.g., 5 minutes) to minimize congestion in the parking structure 106.

At step 306, the server 102 may generate navigational directions to the identified space (at step 304). The server 102 may generate the navigational directions based on a parking layout associated with the parking structure 106 stored in the database 108. Further, the server 102 may monitor vehicle in various lanes in the parking structure 106 to determine the fastest route to the identified parking space.

At step 308, the server 102 may output the generated navigational directions to an output device.

Figure 4:
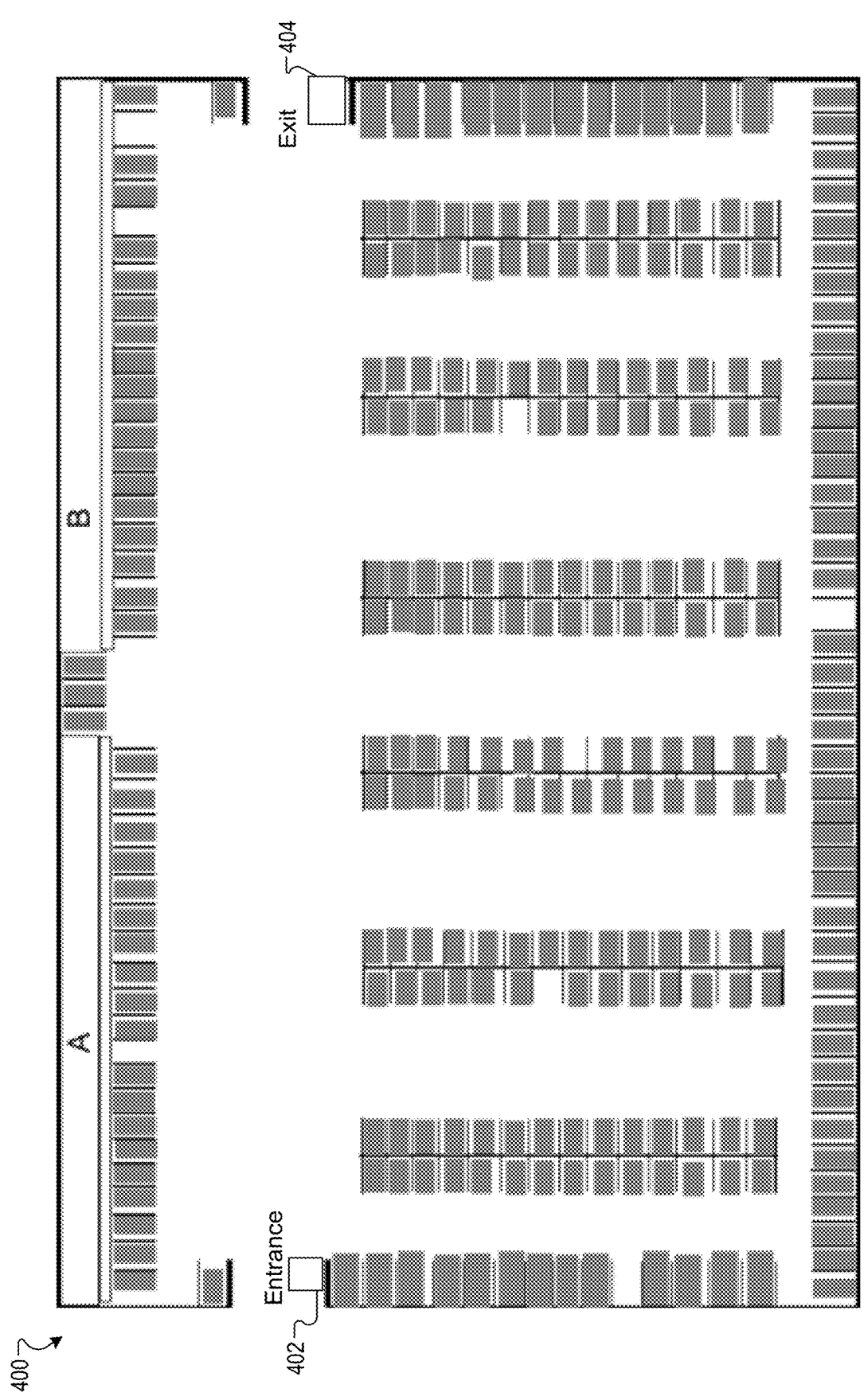
FIG. 4 is a schematic that shows an exemplary parking structure according to one example.

FIG. 4 is a schematic that shows an exemplary parking structure layout 400 according to one example. The parking structure layout includes an entrance and an exit. At the entrance, an entrance device 402 is positioned. At the exit, an exit device 404 is positioned. The entrance device 402 may receive the request to park from the vehicle user. Then, the entrance device 402 may output on a display and/or on an entrance ticket navigational directions to the identified parking space. The exit device 404 may be configured to detect an exiting vehicle and send the information associated with the exiting vehicle to the server 102. The exit device 404 may also receive payments from the vehicle user. The entrance device 402 and the exit device 404 may include communication circuitry and processing circuitry.

Figure 5:
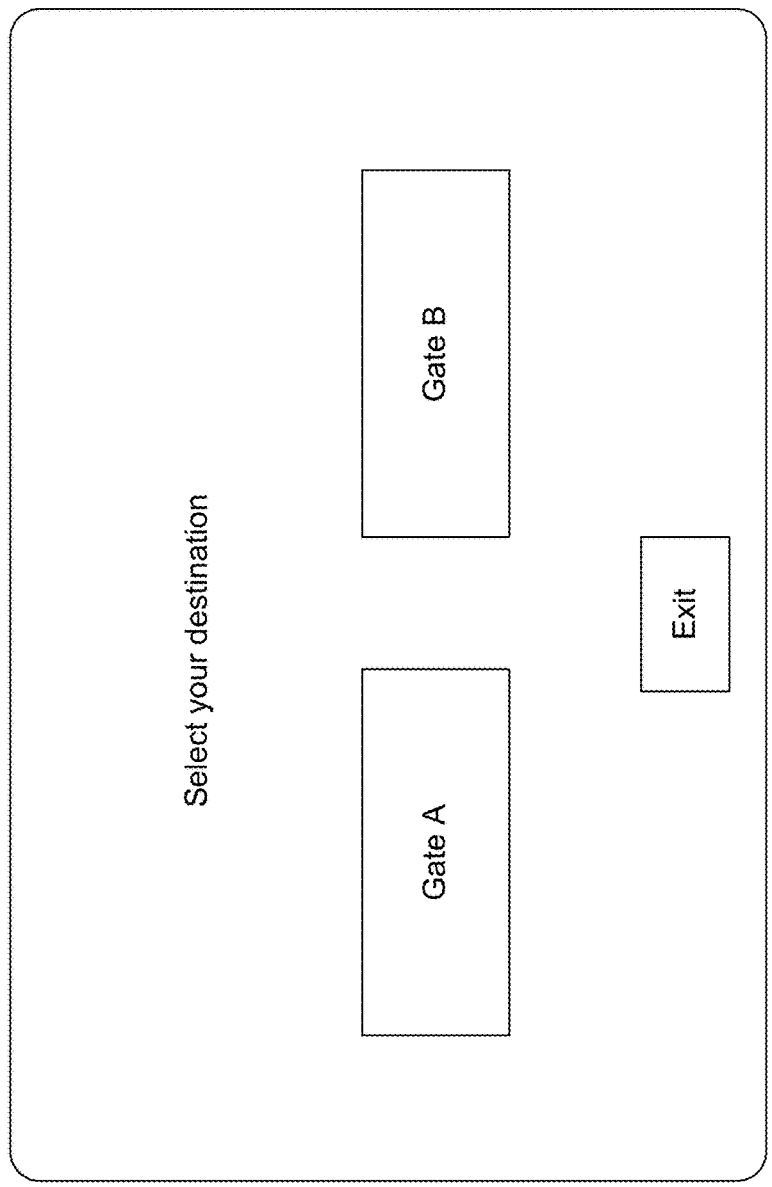
FIG. 5 is a schematic that shows a user interface for destination selection according to one example.

FIG. 5 is a schematic that shows a user interface for destination selection according to one example. The user interface 500 may show one or more destinations associated with the parking structure 106. In one example, the vehicle user may select between "Gate A" and "Gate B". Once a selection by the user is received, the user interface 500 may display navigational directions and/or other information associated with the parking structure 106 (e.g., rate, operation hours, and the like).

Figure 6A:
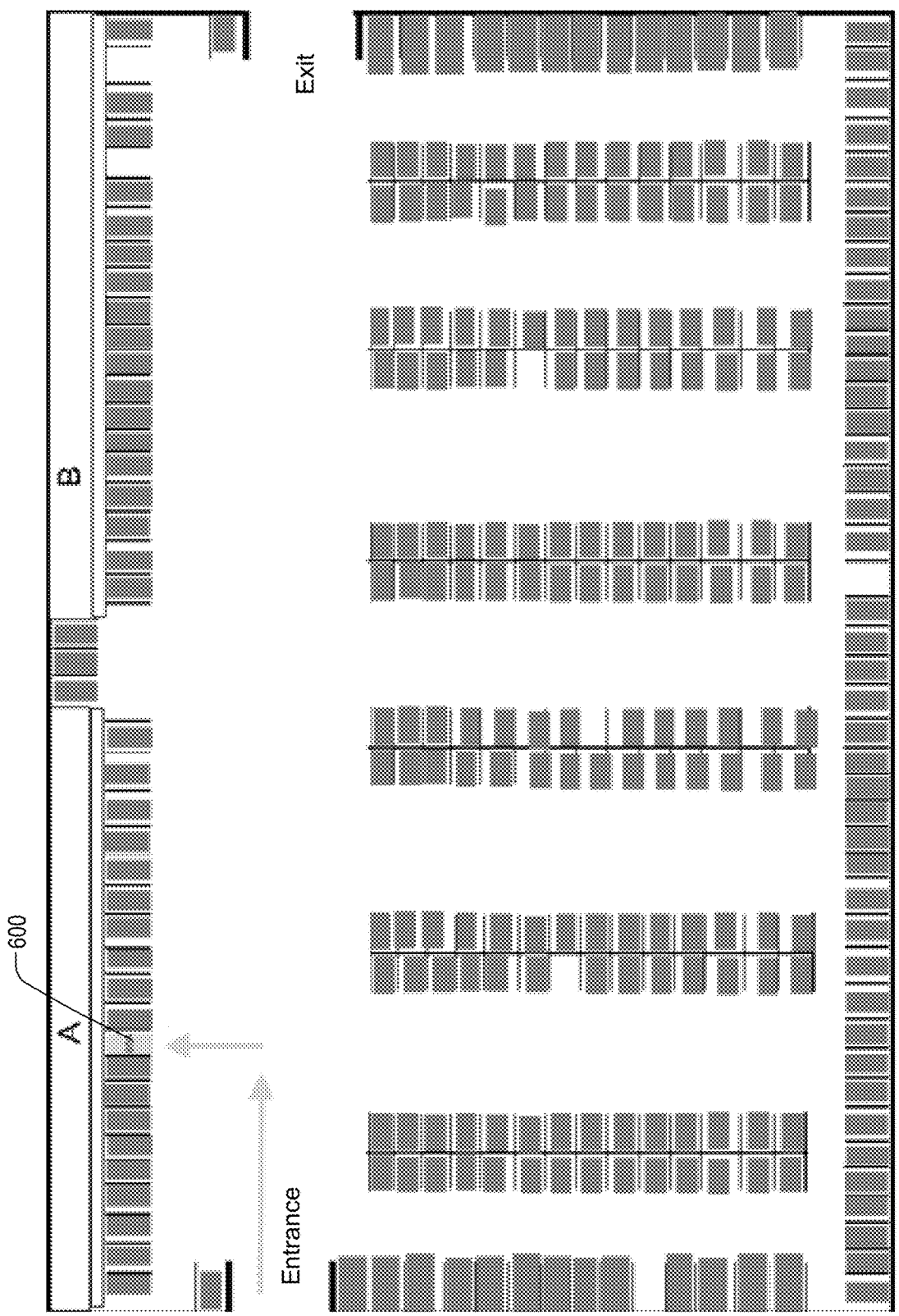
FIGS. 6A-6E are schematics that show an illustration of the operation of the system according to one example.
Figure 6B:
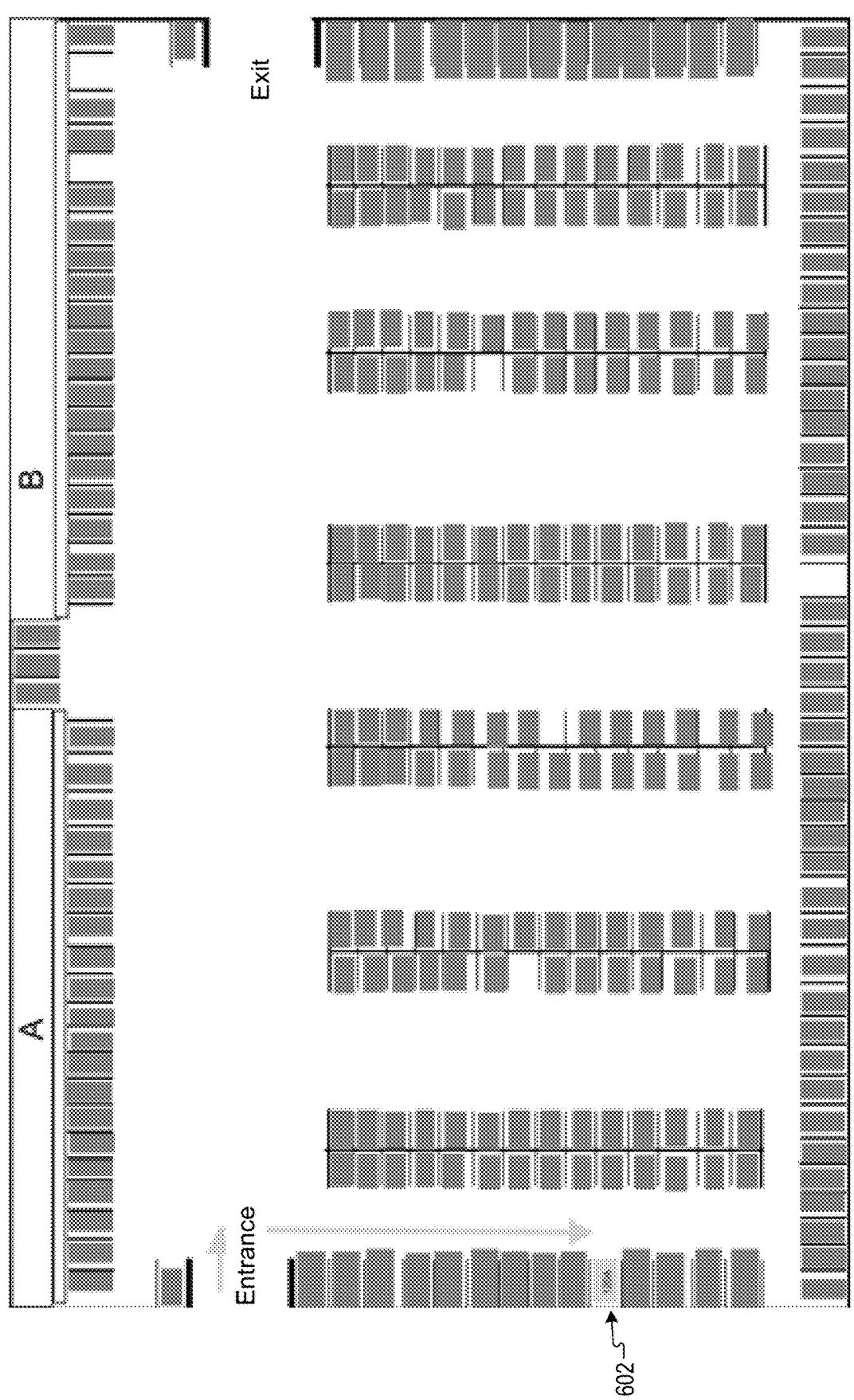
Figure 6C:
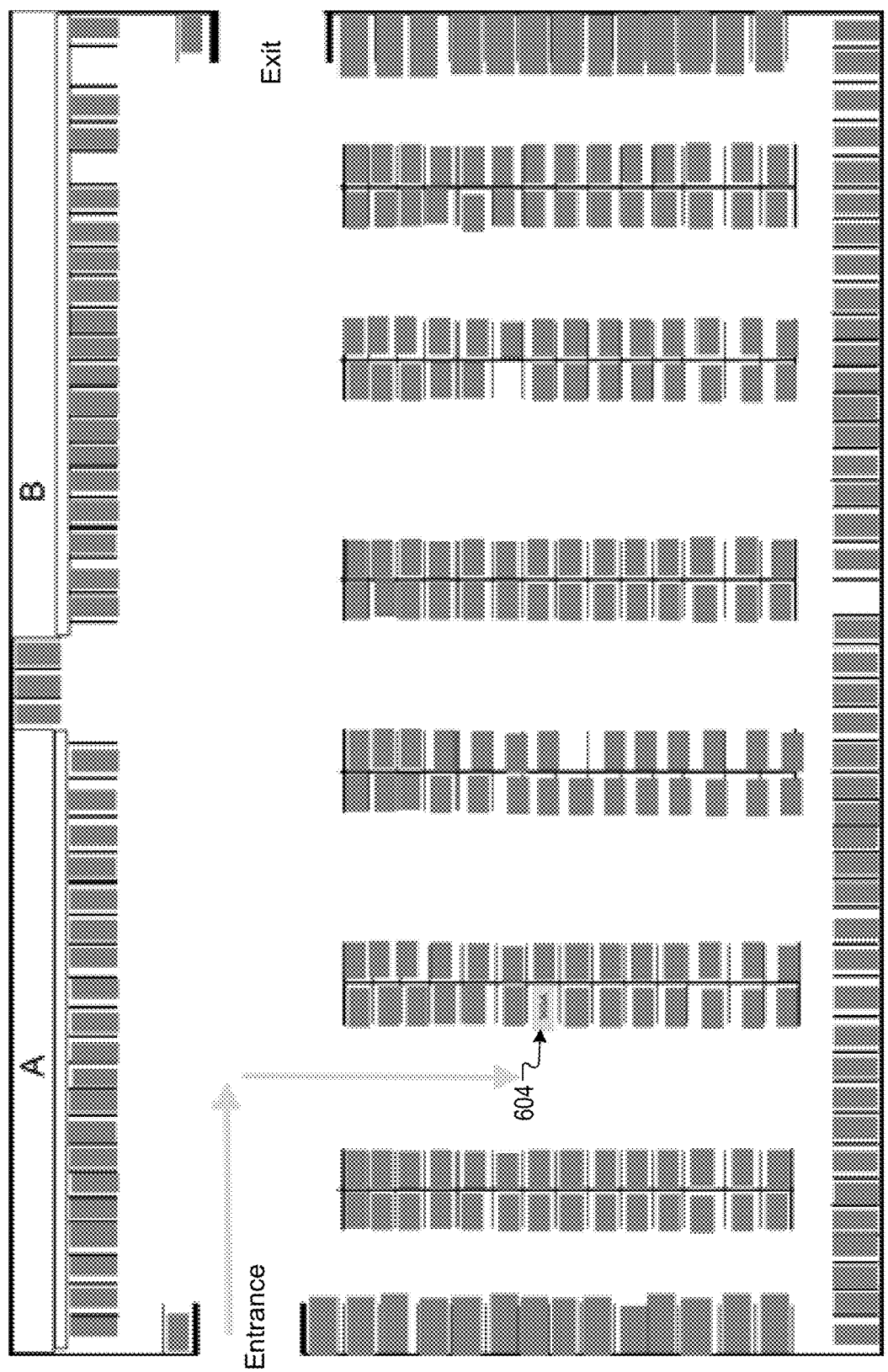
Figure 6D:
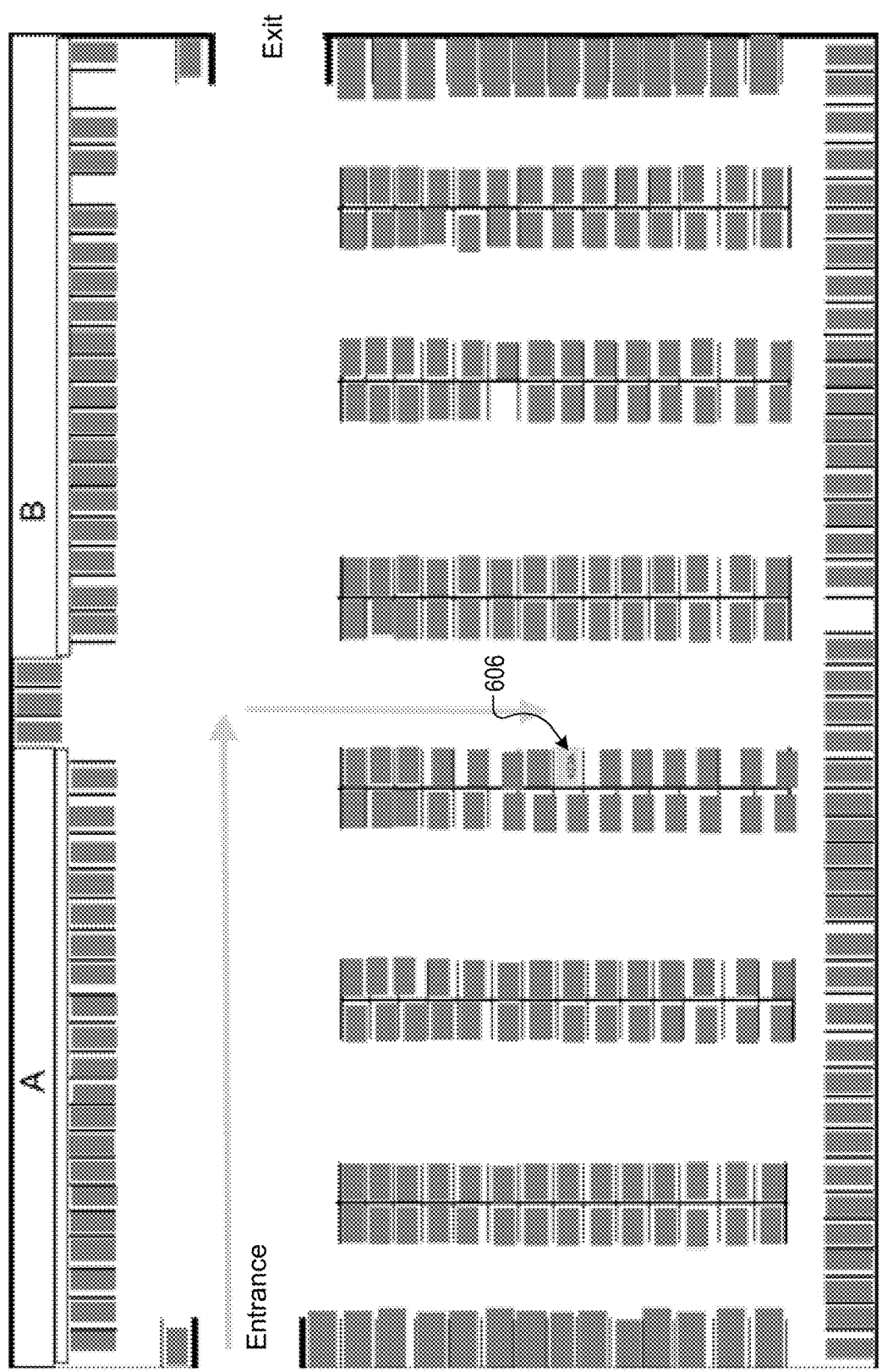
Figure 6E:

FIGS. 6A-6E are schematics that show an illustration of the operation of the system according to one example. In one example, "Gate A" and "Gate B" are available as destinations. A first vehicle user may select "Gate A." As shown in FIG. 6A, parking space 600 is assigned to the vehicle user. The parking space 600 is the closest available space to "Gate A." Parking space 602 is assigned by the server 102 to the next vehicle that enters the parking structure 106 when the vehicle user selects "Gate A" as the destination as shown in FIG. 6B. FIGS. 6C-6E show the subsequent parking space assignments for vehicle users that select "Gate A" (i.e., parking space 604, followed by parking space 606 and parking space 608).

As described previously herein, the system can be used by unmanned vehicle or autonomous vehicle. The entrance device may communicate the navigational directions to the unmanned vehicle. The unmanned vehicle may provide the destination information electronically to the entrance device.

A system which includes the features in the foregoing description provides numerous advantages to users. In particular, the features of the present disclosure provide a multitude of improvements in the technical field of parking management. In particular, the server identifies an optimal parking space based on a plurality of factors including the vehicle user destination. The system provides direction devices through the parking structures to guide the vehicle user. The system compared to other parking lot systems uses less infrastructure and determines an optimal parking space for the driver. The system is user-friendly. In addition, the system minimizes traffic flow, lowers the cost, increases efficiency/productivity, and saves time. The methodology described herein could not be implemented by a human due to the sheer complexity of data processing and includes a variety of novel features and elements that result in significantly more than an abstract idea. Further, the safety and efficiency of the parking structure is improved in condition such evacuation, big sporting events, and the like. Thus, the implementations described herein improve the functionality of the parking structure. Thus, the system and associated methodology described herein amount to significantly more than an abstract idea based on the improvements and advantages described herein.

In one implementation, the functions and processes of the server 102 may be implemented by a computer 726. Next, a hardware description of the computer 726 according to exemplary embodiments is described with reference to FIG. 7. In FIG. 7, the computer 726 includes a CPU 700 which performs the processes described herein. The process data and instructions may be stored in memory 702. These processes and instructions may also be stored on a storage medium disk 704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 726 communicates, such as a server or computer.

Further, the claimed advancements may be provided as a utility application, background daemon, or component of an operating system, or combination thereof, executing in conjunction with CPU 700 and an operating system such as Microsoft® Windows®, UNIX®, Oracle® Solaris, LINUX®, Apple macOS® and other systems known to those skilled in the art.

In order to achieve the computer 726, the hardware elements may be realized by various circuitry elements, known to those skilled in the art. For example, CPU 700 may be a Xenon® or Core® processor from Intel Corporation of America or an Opteron® processor from AMD of America, or may be other processor types that would be recognized by one of ordinary skill in the art. Alternatively, the CPU 700 may be implemented on an FPGA, ASIC, PLD or using discrete logic circuits, as one of ordinary skill in the art would recognize. Further, CPU 700 may be implemented as multiple processors cooperatively working in parallel to perform the instructions of the inventive processes described above.

The computer 726 in FIG. 7 also includes a network controller 706, such as an Intel Ethernet PRO network interface card from Intel Corporation of America, for interfacing with network 724. As can be appreciated, the network 724 can be a public network, such as the Internet, or a private network such as LAN or WAN network, or any combination thereof and can also include PSTN or ISDN sub-networks. The network 724 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 726 further includes a display controller 708, such as a NVIDIA® GeForce® GTX or Quadro® graphics adaptor from NVIDIA Corporation of America for interfacing with display 710, such as a Hewlett Packard® HPL2445w LCD monitor. A general purpose I/O interface 712 interfaces with a keyboard and/or mouse 714 as well as an optional touch screen panel 716 on or separate from display 710. General purpose I/O interface also connects to a variety of peripherals 718 including printers and scanners, such as an OfficeJet® or DeskJet® from Hewlett Packard®.

The general purpose storage controller 720 connects the storage medium disk 704 with communication bus 722, which may be an ISA, EISA, VESA, PCI, or similar, for interconnecting all of the components of the computer 726. A description of the general features and functionality of the display 710, keyboard and/or mouse 714, as well as the display controller 708, storage controller 720, network controller 706, and general purpose I/O interface 712 is omitted herein for brevity as these features are known.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A parking system, the parking system comprising:
an entrance device positioned at an entrance of a parking structure, the entrance device being configured to receive an input from a vehicle user of a vehicle;
one or more cameras positioned at the entrance of the parking structure and at an exit of the parking structure;
an output device; and
a server configured to:
provide via the entrance device a user interface for destination selection, the destination selection consisting of a first destination and a second destination associated with the parking structure for selection by the vehicle user,
receive, via communication circuitry, the input from the entrance device, the input including a selection of the first destination or the second destination by the vehicle user,
estimate overall dimensions of the vehicle based on one or more images captured via the one or more cameras at the entrance of the parking structure,
determine a type of the vehicle based on the estimated overall dimensions,
select a parking space in the parking structure based on a proximity to the selected first or second destination, a permit associated with the vehicle, a parking space type, and destination information of preceding vehicle user inputs,
update a look-up table to mark the selected parking space as occupied prior to the vehicle reaching the selected parking space,
generate navigational directions to the selected parking space,
provide, via the communication circuitry, the navigational directions to the output device, the navigational directions being in a map format, then,
detect the vehicle leaving the parking structure,
capture one or more images of a license plate of the vehicle leaving the parking structure via the one or more cameras positioned at the exit of the parking structure,
determine license place indicia of the license plate from the captured one or more images,
identify an actual parking space previously occupied by the vehicle based on an association between the license plate indicia and an identification of the actual parking space stored in the look-up table, and
update the look-up table to mark the previously occupied parking space associated with the vehicle as available,
wherein, to minimize congestion in the parking structure, the server selects, for the vehicle, the selected parking space in a different row or in a different level from a second parking space associated with a previous vehicle of a previous vehicle user when the vehicle user and the previous vehicle user both selected the first destination or the second destination at the entrance when the vehicle and the previous vehicle enter the parking structure within a predetermined period of time from each other and when a parking space is available in a same row or a same level as the second parking space associated with the previous vehicle, and
wherein the navigational directions are specific to the vehicle and the selected parking space and are output only upon and responsive to detection of the vehicle in each of a plurality of predefined portions of the parking structure between the entrance and the exit of the parking structure.

2. The parking system of claim 1, further comprising:
displays configured to output one or more steps of the navigational directions based on an identification of the vehicle via near field communication between a smart card and a display, wherein the displays are positioned in the parking structure and each display is configured to display a straight arrow, a left arrow, or a right arrow.

3. The parking system of claim 1,
wherein the entrance device is configured to output the navigational directions.

4. A method for parking management, the method comprising:
providing via an entrance device a user interface for destination selection, the destination selection consisting of a first destination and a second destination associated with a parking structure for selection by a vehicle user, the entrance device being positioned at an entrance of the parking structure,
receiving, via communication circuitry, an input from the vehicle user via the entrance device, the input including a selection of the first destination or the second destination by the vehicle user;
estimating overall dimensions of a vehicle of the vehicle user based on one or more images captured via one or more cameras positioned at the entrance of the parking structure;
determining a type of the vehicle based on the estimated overall dimensions;
selecting, using processing circuitry of a server, a parking space based on a proximity to the selected first or second destination, a parking space type, and destination information of preceding vehicle user inputs;
updating a look-up table to mark the selected parking space as occupied prior to the vehicle reaching the selected parking space;

generating, using the processing circuitry, navigational directions to the selected parking space, the navigational directions being in a map format;
providing, via the communication circuitry, the navigational directions to at least one output device, then;
detecting the vehicle leaving the parking structure;
capturing one or more images of a license plate of the vehicle via one or more cameras positioned at an exit of the parking structure;
determining license place indicia of the license plate from the captured one or more images captured by the one or more cameras positioned at the exit of the parking structure;
identifying an actual parking space previously occupied by the vehicle based on an association between the license plate indicia and an identification of the actual parking space stored in a look-up table; and
updating the look-up table to mark the previously occupied parking space associated with the vehicle as available,
wherein, to minimize congestion in the parking structure, the selected parking space is selected, for the vehicle, in a different row or in a different level from a second parking space associated with a previous vehicle of a previous vehicle user when the vehicle and the previous vehicle user both selected the first destination or the second destination at the entrance when the vehicle and the previous vehicle enter the parking structure within a predetermined period of time from each other and when a parking space is available in a same row or a same level as the second parking space associated with the previous vehicle, and
wherein the navigational directions are specific to the vehicle and the selected parking space and are output periodically, only upon and responsive to detection of the vehicle in each of a plurality of predefined positions in the parking structure between the entrance and the exit of the parking structure.

5. The method of claim 4, further comprising:
outputting via displays one or more steps of the navigational directions based on an identification of the vehicle via near field communication between a smart card and a display, wherein the displays are positioned in the parking structure and each display is configured to display a straight arrow, a left arrow, or a right arrow.

6. The method of claim 4, wherein the navigational directions are in an audible format.

7. A non-transitory computer readable medium storing computer-readable instructions therein which when executed by a computer cause the computer to perform a method for parking management, the method comprising:
providing via an entrance device a user interface for destination selection, the destination selection consisting of a first destination and a second destination associated with a parking structure for selection by the vehicle user, the entrance device being positioned at an entrance of the parking structure;
receiving an input from the entrance device, the input including a selection of the first destination or the second destination by the vehicle user;
estimating overall dimensions of a vehicle of the vehicle user based on one or more images captured via one or more cameras positioned at the entrance of the parking structure;
determining a type of the vehicle based on the estimated overall dimensions;
identifying a parking space in the parking structure based on a proximity to the selected first or second destination, a parking space type, and destination information of preceding vehicle user inputs;
updating a look-up table to mark the selected parking space as occupied prior to the vehicle reaching the selected parking space;
generating navigational directions to the parking space, the navigational directions being in a map format;
providing the navigational directions to at least one output device, then;
detecting the vehicle leaving the parking structure;
capturing one or more images of a license plate of the vehicle via one or more cameras positioned at an exit of the parking structure;
determining license place indicia of the license plate from the captured one or more images captured by the one or more cameras positioned at the exit of the parking structure;
identifying an actual parking space previously occupied by the vehicle based on an association between the license plate indicia and an identification of the actual parking space stored in a look-up table; and
updating the look-up table to mark the previously occupied parking space associated with the vehicle as available,
wherein, to minimize congestion in the parking structure, the selected parking space is selected, for the vehicle, in a different row or in a different level from a second parking space associated with a previous vehicle of a previous vehicle user when the vehicle user and the previous vehicle user both selected the first destination or the second destination at the entrance when the vehicle user and the previous vehicle user enter the parking structure within a predetermined period of time from each other and when a parking space is available in a same row or a same level as the second parking space associated with the previous vehicle, and
wherein the navigational directions are specific to the vehicle and the selected parking space and are output periodically, only upon and responsive to detection of the vehicle in each of a plurality of predefined positions in the parking structure, as the vehicle moves from the entrance to the selected parking space.

8. The parking system of claim 1, wherein the predetermined period of time is five minutes.

9. The parking system of claim 1, wherein the navigational directions are audibly provided via a predetermined broadcast radiochannel.

10. The parking system of claim 1, wherein the navigational directions are printed on an entrance ticket obtained when the vehicle user enters the parking structure.

11. The parking system of claim 1, wherein the server is further configured to:
monitor vehicles in various lanes of the parking structures; and
determine the fastest route to the selected parking space as a function of the monitoring.

12. The parking system of claim 1, wherein the first destination or the second destination is a gate number or section information in a sport arena.

13. The parking system of claim 1, further comprising:
sensors configured to detect space occupancy and consisting of sensors mounted at a ceiling of the parking structure, and a database configured to store information associated with the sensors including an image, parking availability, restricted hours, and status of the parking space.

\* \* \* \* \*